(12) United States Patent
Schote et al.

(10) Patent No.: US 10,391,827 B2
(45) Date of Patent: Aug. 27, 2019

(54) WHEEL SUSPENSION FOR THE REAR AXLE OF A VEHICLE

(71) Applicant: Dr. Ing. h.c. F. Porsche Aktiengesellschaft, Stuttgart (DE)

(72) Inventors: Norbert Schote, Ammerbuch (DE); Andreas Becker, Winnenden (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 98 days.

(21) Appl. No.: 15/793,118

(22) Filed: Oct. 25, 2017

(65) Prior Publication Data
US 2018/0111434 A1 Apr. 26, 2018

(30) Foreign Application Priority Data
Oct. 26, 2016 (DE) .......................... 10 2016 120 424

(51) Int. Cl.
| | |
|---|---|
| B60G 7/00 | (2006.01) |
| B60G 3/18 | (2006.01) |
| B60G 11/15 | (2006.01) |
| B60G 13/00 | (2006.01) |
| B60G 3/20 | (2006.01) |

(52) U.S. Cl.
CPC .............. *B60G 7/001* (2013.01); *B60G 3/18* (2013.01); *B60G 3/20* (2013.01); *B60G 11/15* (2013.01); *B60G 13/001* (2013.01); *B60G 2200/18* (2013.01); *B60G 2204/10* (2013.01)

(58) Field of Classification Search
CPC . B60G 3/20; B60G 3/18; B60G 11/15; B60G 13/001; B60G 7/001; B60G 2200/18; B60G 2204/10

USPC ................... 280/124.134, 124.135, 124.136
See application file for complete search history.

(56) References Cited

U.S. PATENT DOCUMENTS

| | | | | |
|---|---|---|---|---|
| 4,538,831 A * | 9/1985 | Kami | ..................... | B60G 3/265 180/253 |
| 4,754,992 A * | 7/1988 | Asanuma | ................. | B60G 3/22 280/124.135 |
| 5,538,274 A * | 7/1996 | Schmitz | .................... | B60G 3/20 267/141.2 |
| 5,975,541 A * | 11/1999 | Harara | ..................... | B60G 3/18 280/124.135 |
| 6,116,626 A * | 9/2000 | Cherry | ................... | B60G 7/001 188/329 |
| 6,357,772 B1 * | 3/2002 | Pelz | ......................... | B60G 3/18 280/124.135 |
| 7,625,000 B2 * | 12/2009 | Campbell | ................ | B60G 3/12 280/124.133 |
| 7,896,372 B2 * | 3/2011 | Yanagida | ................ | B60G 3/20 280/124.135 |
| 2006/0261570 A1 * | 11/2006 | Eshelman | ............... | B60G 3/20 280/124.134 |
| 2014/0049017 A1 * | 2/2014 | Buchwitz | ................ | B60G 3/20 280/124.134 |
| 2015/0183286 A1 * | 7/2015 | Bruehl | ..................... | B60G 3/20 280/124.135 |

(Continued)

*Primary Examiner* — Toan C To
(74) *Attorney, Agent, or Firm* — RatnerPrestia

(57) ABSTRACT

A wheel suspension for the rear axle of a vehicle has a wheel carrier for fastening a rear wheel. A link system including at least two links is fastened on the wheel carrier to enable fastening on a vehicle body of the vehicle. The wheel carrier has a link portion for direct or indirect mounting on the vehicle body of the vehicle.

10 Claims, 5 Drawing Sheets

(56) References Cited

U.S. PATENT DOCUMENTS

| | | | | |
|---|---|---|---|---|
| 2015/0273963 A1* | 10/2015 | Zandbergen | ............. | B60G 3/20 |
| | | | | 280/124.109 |
| 2015/0375588 A1* | 12/2015 | Czerr | ..................... | B60G 3/202 |
| | | | | 280/124.135 |

* cited by examiner

WHEEL SUSPENSION FOR THE REAR AXLE OF A VEHICLE

CROSS-REFERENCE TO RELATED APPLICATION

This application claims priority to German Patent Application No. DE 10 2016 120 424.2, filed Oct. 26, 2016, the content of such application being incorporated by reference herein in its entirety.

FIELD OF THE INVENTION

The present invention relates to a wheel suspension for the rear axle of a vehicle and to such a rear axle of a vehicle.

BACKGROUND OF THE INVENTION

It is known that vehicles have wheel suspensions for rotatably mounting a wheel on the vehicle for the respective axle of the vehicle. In this context, wheel suspensions both for the rear axle and for the front axle are known. A wheel suspension in the conventional sense normally has a wheel carrier, on which rotatable mounting of the associated wheel, that is to say in respect of the rear wheel in the case of the rear axle, can be performed. The respective wheel carrier is fastened on the vehicle body by means of a link system comprising various links. In this context, the vehicle body is, in particular, one or more structural components, which can also form the bodywork of the vehicle. The link system comprising two or more links is generally used to provide directional stability and, at the same time, to allow necessary movements of the respective wheel carrier attached by means of the link system. Here, the corresponding movement is, in particular, the camber behavior of the respective wheel and the spring deflection behavior of the respective wheel. If this is a steered axle, the respective links of the link system must also be able to provide the steering movement of the wheel carrier.

One disadvantage with the known solutions is that the link system, in particular, has a large number of different links for the different degrees of freedom and the different orientations of the forces to be absorbed. This leads, in particular, to a relatively large-volume construction. It has proven particularly disadvantageous here, especially in the case of flat vehicles, that at least one link generally connects the vehicle body to the wheel carrier above the wheel center. This is necessary particularly in order to support corresponding side forces on the rear wheel of the wheel carrier. On the one hand, this tall installation space prevents vehicles being made as flat as possible and, on the other hand, it prevents a load space for accommodating storage space of a luggage compartment or for accommodating a rear engine in the region of the rear axle.

SUMMARY OF THE INVENTION

The present invention makes available, in an economical and simple manner, a wheel suspension in which the overall height can be reduced while retaining or even increasing stability.

Features and details which are described in connection with the wheel suspension according to aspects of the invention also apply, of course, in connection with the rear axle according to aspects of the invention and vice versa, and therefore reference is or can be made constantly from one to the other in respect of the disclosure of the individual aspects of the invention.

According to aspects of the invention, a wheel suspension for a rear axle of a vehicle is proposed. Such a wheel suspension has a wheel carrier for fastening a rear wheel. A link system comprising at least two links is fastened on the wheel carrier to enable fastening on a vehicle body of the vehicle. A wheel suspension according to aspects of the invention is wherein the wheel carrier has a link portion for indirect mounting on the vehicle body of the vehicle, via a short rod-type link, preferably aligned in the Z direction, referred to below as a coupling link, or for direct mounting thereon.

In the case of direct mounting of the link portion on the vehicle body, the coupling link is replaced by a supporting mount (also referred to as a coupling mount). A mount of this kind is intended to transmit the forces only in the vertical direction of the vehicle and thus to be equivalent kinematically to the coupling link.

In contrast to the known solutions, the wheel carrier is now no longer fastened on the vehicle body exclusively by means of the link system and the individual links. On the contrary, the wheel carrier itself is equipped with a link portion, which enables the wheel carrier to be mounted on the vehicle body. In other words, the wheel carrier now forms part of the overall link system since it provides a link portion. This link portion assumes some of the tasks of the individual links of the link system and in this way replaces at least one link of the link system.

By virtue of the fact that the wheel carrier as a basic component is generally made from a cast material, the corresponding link portion can be formed jointly with the wheel carrier in a simple and low-cost manner, in particular in a manner which allows simple production in terms of manufacturing technology. As explained below, this union of functions can also lead, through union of material between the wheel carrier and the link portion, to an integral construction.

By virtue of the fact that the wheel carrier now has a link portion for mounting on the vehicle, at least one link of the link system can be omitted. This is preferably the upper transverse link (also referred to as the camber link), with the result that the coupling function of the wheel carrier or of the link system for the wheel carrier can now be performed by the link portion of the wheel carrier itself. In this way, camber links of a link system can be eliminated. By virtue of the fact that a camber link generally had to be arranged centrally above the wheel carrier to support side forces, the installation space required for that purpose can now be made available for a different use. The overall wheel suspension can now dispense with such a link arranged above the wheel carrier, and therefore it has been possible to reduce the installation space for the overall wheel suspension system, especially in the upper region of the wheel carrier. Here, the link portion itself can have any desired geometrical shape and, in particular, can extend away from the axis of rotation of the rear wheel to be fastened on the wheel carrier. In order to be able to have an extent in the direction described from this axis of rotation of the rear wheel, a lever-type design of the link portion is usually provided in order to bridge the corresponding distance from the wheel carrier to the vehicle body while nevertheless also making it possible to achieve a good basis of support for the absorption of the side forces acting on the wheel.

A wheel suspension according to aspects of the invention can be used both for passive and for driven rear axles.

Depending on how complex the required motion behavior of the rear wheel has to be, it is also possible in corresponding fashion to provide more than at least two links for the link system. Thus, it is possible for a wheel suspension according to aspects of the invention to be used not only for passive or active rear axles but even for steered rear axles. Here, the fastening of the individual links is used, in particular, to provide a support for the motion of the wheel relative to the bodywork. Here, the individual links can likewise be mounted movably both on the vehicle body and/or, by means of the link system, on the wheel carrier itself. This is preferably the rotary mounting, described in detail below, on the wheel carrier and on the vehicle body. Damping, e.g. with the aid of a rubber element, as explained in detail below, can also be used for individual links and for the link portion.

As already explained, the link portion is intended, in particular, to replace a link function of a separate link of the link system. This preferably concerns the camber link of the link system.

It can be advantageous if the link system in a wheel suspension according to aspects of the invention has the following links:
  spring link
  track rod
  control blade
  coupling link It can also be advantageous if, in a wheel suspension according to aspects of the invention, the links of the link system are arranged below the link portion of the wheel carrier. Here, the reference is set in relation to a "Z axis", which is oriented perpendicularly or substantially perpendicularly to the road surface underneath the vehicle. The direction of travel extends, as it were, in an X direction of the vehicle, and a Y axis extends perpendicularly thereto and parallel to the underside, underneath the vehicle. The Z axis vertically upward through the vehicle completes this XYZ coordinate system. Thus, as soon as a link or a plurality of links of the link system are arranged underneath in relation to this Z axis of the link portion of the wheel carrier, the installation space above the link portion remains substantially free from links of the link system. This enhances the advantage according to aspects of the invention, namely that of as far as possible reducing the installation space above the wheel carrier even further since there is no longer any link of the link system arranged in the region above the wheel carrier and, in particular, above the link portion. In other words, this variant of the wheel suspension has the effect that a particularly compact construction, especially in respect of a shallow embodiment of the wheel suspension, can be made available.

A further advantage can be achieved if, in a wheel suspension according to aspects of the invention, the link portion of the wheel carrier is fastened on the vehicle body by means of a coupling link or coupling mount, supplementing the links of the link system. In particular, a coupling link of this kind serves to absorb side forces of the vehicle as soon as the vehicle is in forward motion or reverse motion during operation. Here, therefore, the link portion fundamentally supplements not only the attachment of the wheel carrier to the vehicle body in mechanical terms but furthermore also supplements the individual functionalities of the link system. As has already been explained at the outset, the link portion can thus provide a function of the link system, thus making it possible to eliminate other links which have originally provided this function in the known solutions according to the prior art. Since the camber link for absorbing side forces is generally a single link which is arranged above the link portion, it is possible, by eliminating said link through the use of a link portion according to aspects of the invention, to achieve one of the advantages according to aspects of the invention, namely that a construction which is as shallow as possible can be made available.

It is furthermore advantageous if, in a wheel suspension according to aspects of the invention, the wheel carrier has a damping interface for fastening in a damping device. A damping device of this kind can be the damping device of a spring damper, for example. In this way, it is possible, in particular by dividing a spring and a damper between two separate construction sections, to provide greater design and geometric freedom. In particular, there is also the possibility of freedom of choice in the alignment of a spring deflection axis vis-à-vis the damping axis, thus making it possible to achieve advantages in respect of directional stability and driving dynamics. Here, the damping interface serves, in particular, for reversible fastening of the damping device. In this case, the type of damping device is substantially freely selectable. However, the decisive point is that the movements of the wheel and hence the forces which are introduced into the vehicle body by these movements can be transmitted into the damping interface in a damped manner to the vehicle body via the damping interface.

A further advantage can be achieved if, in a wheel suspension according to aspects of the invention, the links of the link system and/or the link portion of the wheel carrier have rubber mounts for fastening on the vehicle body. A rubber mount of this kind is used, in particular, to reduce vibration transmission in the manner according to aspects of the invention. By reducing vibration or frequency-related forces acting in other ways, it is also possible to achieve a reduction in wear on the overall wheel suspension system. Here, the rubber mounts can be arranged both on the vehicle body and, with appropriate fastening, also on the wheel carrier. However, it is preferred if the rubber mounts are provided substantially exclusively at the fastening with respect to the respective vehicle body.

It is furthermore advantageous if, in a wheel suspension according to aspects of the invention, the links of the link system are rotatably mounted on the wheel carrier. Such a rotatable mounting serves to enable the desired degrees of freedom for the movement of the wheel carrier and hence for the fastened rear wheel. In this case, the axis of rotation of the respective rotatable mounting of the associated link is designed in the desired manner for the desired motion functionality. In particular, the individual axes of rotation of the rotatable attachments of the individual links are matched to one another in such a way that a clearly defined camber situation is provided for dearly defined allowed movements of the rear wheel for spring deflection movements, damping movements, driving movements and/or steering movements.

It can furthermore be advantageous if, in a wheel suspension according to aspects of the invention, the links of the link system are arranged on two different sides of the link portion of the wheel carrier, in relation to the direction of travel of the vehicle. As has already been explained, a coordinate system with an XY plane parallel to the underside of the vehicle or to the surface of the roadway and a central, vertical Z axis can be set up for a vehicle. As soon as the link portion is then substantially transverse to this direction of travel when viewed in the direction of travel, it is possible to define the different sides in relation to this direction of travel. Arranging the two links of the link system in front of and behind the link portion has the effect of making it possible to provide further flattening of the overall wheel suspension system. In this arrangement, the links are arranged, in particular, at the same level or below the link portion in relation to the Z axis. This widening of the link system involves further flattening, thus making it possible, in particular, to achieve the advantages according to aspects of the invention better and with even greater breadth by arranging a control blade ahead of the link portion in the direction of travel.

It can be a further advantage if, in a wheel suspension according to aspects of the invention, the link portion of the wheel carrier is formed in one piece with a main body of the wheel carrier. In particular, wheel carriers are produced from a cast material. However, other methods, e.g. built-up production for monolithic, integral and/or one-piece formation of the link portion with the wheel carrier, are also conceivable. In this case, the wheel carrier can be equipped at least in part, especially in the region of the link portion, with reinforcing structures, e.g. rib-shaped structures, in order nevertheless to be able to provide the desired mechanical stability through lightweight construction.

A rear axle of a vehicle, having at least two wheel suspensions according to aspects of the invention, likewise forms the subject matter of the present invention. Thus, a rear axle according to aspects of the invention provides the same advantages as those which have been explained in detail with reference to a wheel suspension according to aspects of the invention. Of course, the advantages according to aspects of the invention can be obtained not only in a wheel suspension for a rear axle but also for other axles of a vehicle.

BRIEF DESCRIPTION OF THE DRAWINGS

Further advantages, features and details of the invention will become apparent from the following description, in which illustrative embodiments of the invention are described in detail with reference to the drawings. In the schematic drawing.

DETAILED DESCRIPTION OF THE INVENTION

Figure 1:
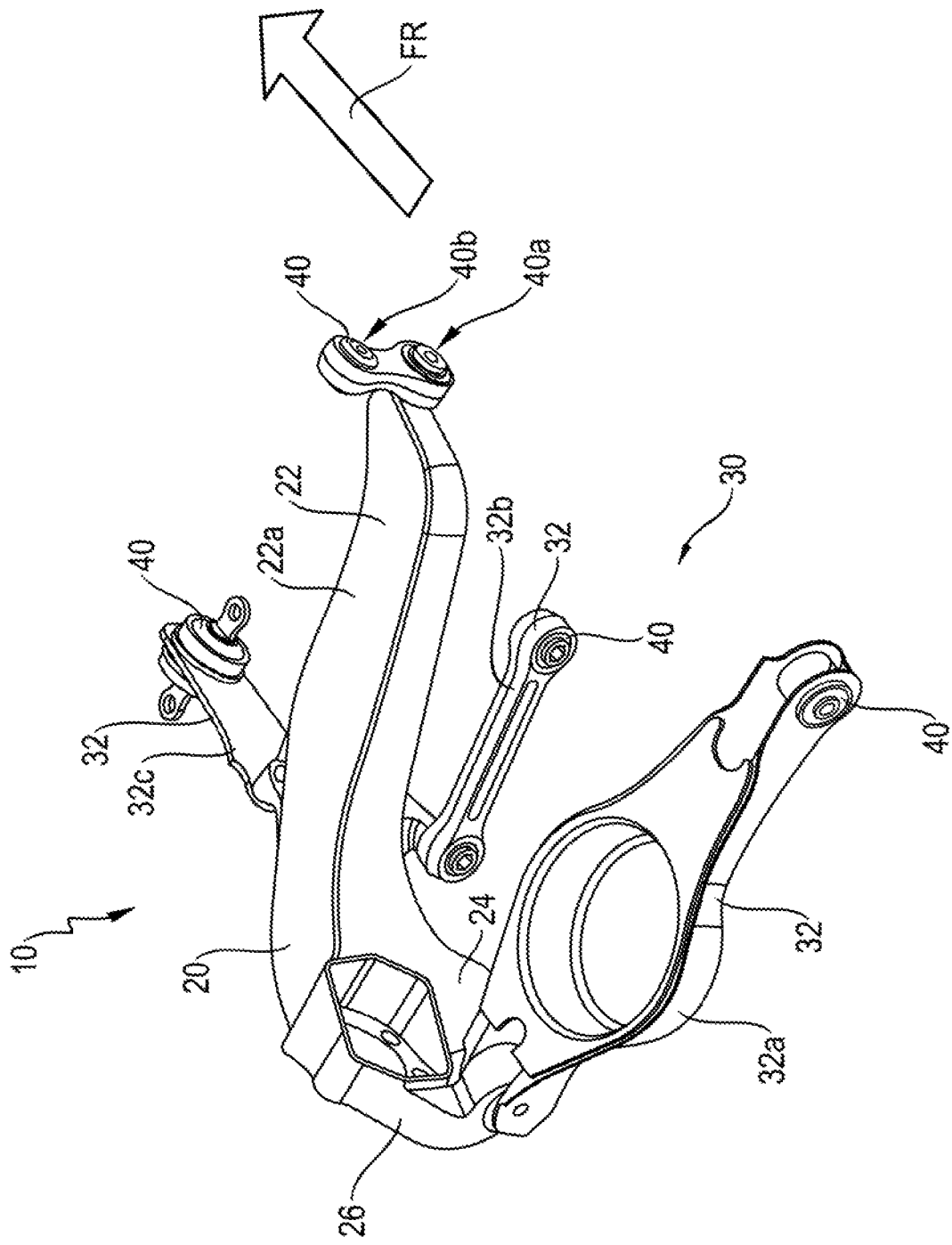
FIG. 1 shows a first embodiment of a wheel suspension according to aspects of the invention in a partially assembled state.

FIGS. 1 to 5 show one embodiment of a wheel suspension 10 according to aspects of the invention. FIG. 1 illustrates how the wheel suspension 10 itself can be configured, without an associated spring device 120 or an associated damping device 110. Here, the wheel carrier 20 is provided with a main body 26. It is on this main body 26 that the rear wheel 200 can then be fastened, as will be explained in greater detail below with reference to FIG. 5. Fundamentally, the wheel carrier 20 is designed for attachment and fastening to a vehicle body 300 with the aid of a link system 30. The link system 30 in this embodiment shown in FIG. 1 is equipped with a spring link 32a for receiving a spring device 120 and with a track rod 32b and a control blade 32c. As can already be seen from FIG. 1, the wheel carrier 20 is designed with a main body 26 produced in the manner of a casting, which also has a link portion 22 in integral fashion. The link portion 22 serves for direct fastening on the vehicle body 300, as can also be seen in FIG. 5. As can likewise be seen, the link portion 22, through being designed as a coupling link 22a, completes the overall functionality of the link system 30. The wheel carrier 20 has a link portion 22 for fastening on the vehicle body 300 of the vehicle via a coupling link 40. Instead of a coupling link 40, a coupling mount could also be used, as explained above. This alternative is not shown in the figures.

As can furthermore be seen from FIG. 1, the coupling link 40 has a lower attachment point 40a and an upper attachment point 40b. The present wheel suspension is wherein, in contrast to a conventional wheel suspension, the upper transverse link is eliminated and, instead, the coupling link 40 is introduced. The spring link 32a, the track rod 32b and the control blade 32c are arranged in one plane below the wheel center plane. By virtue of this measure, the wheel suspension described is of very shallow construction, which is advantageous when used in a light commercial vehicle.

Figure 2:
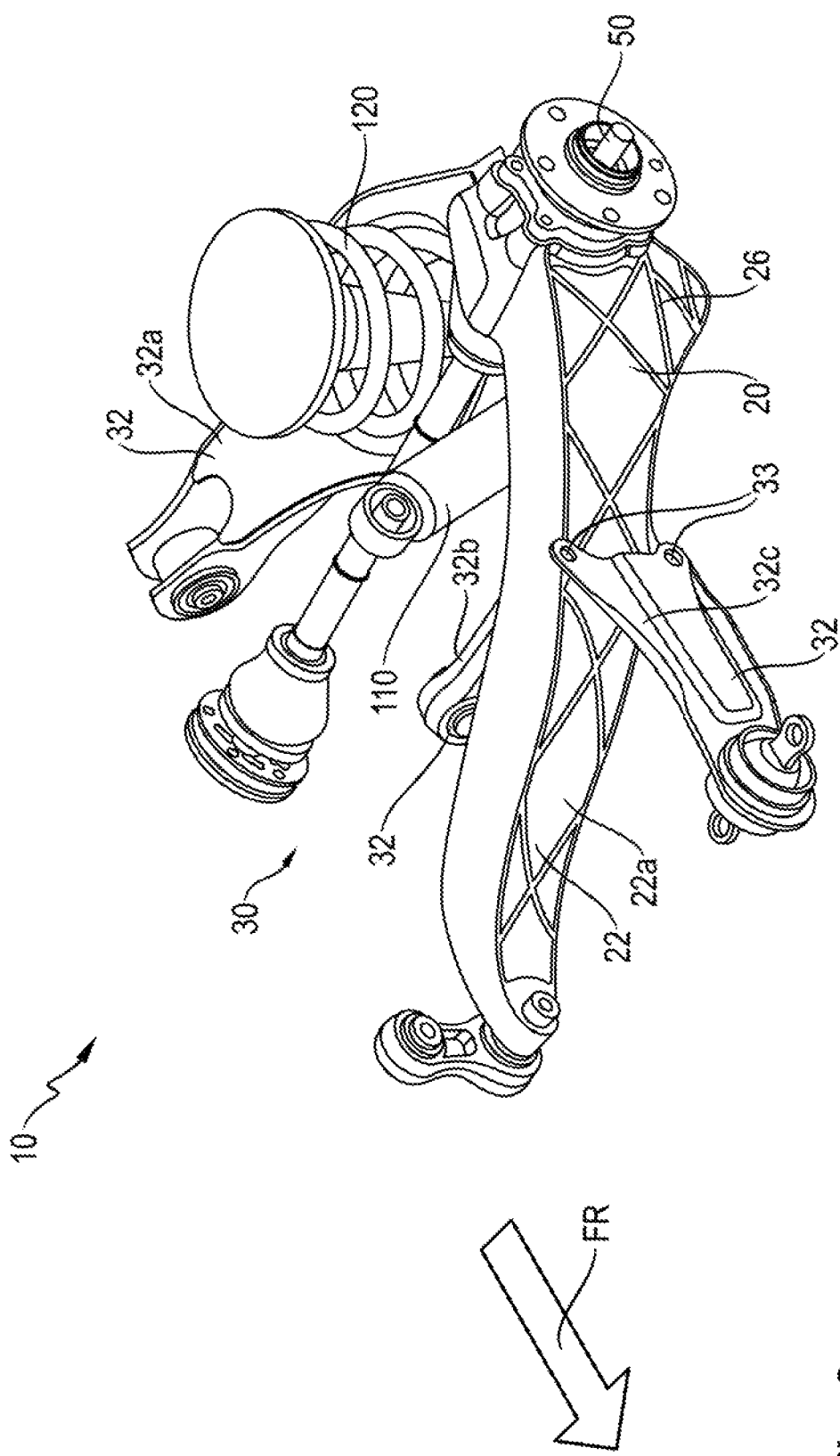
FIG. 2 shows the embodiment of FIG. 1 in the assembled state.
Figure 3:
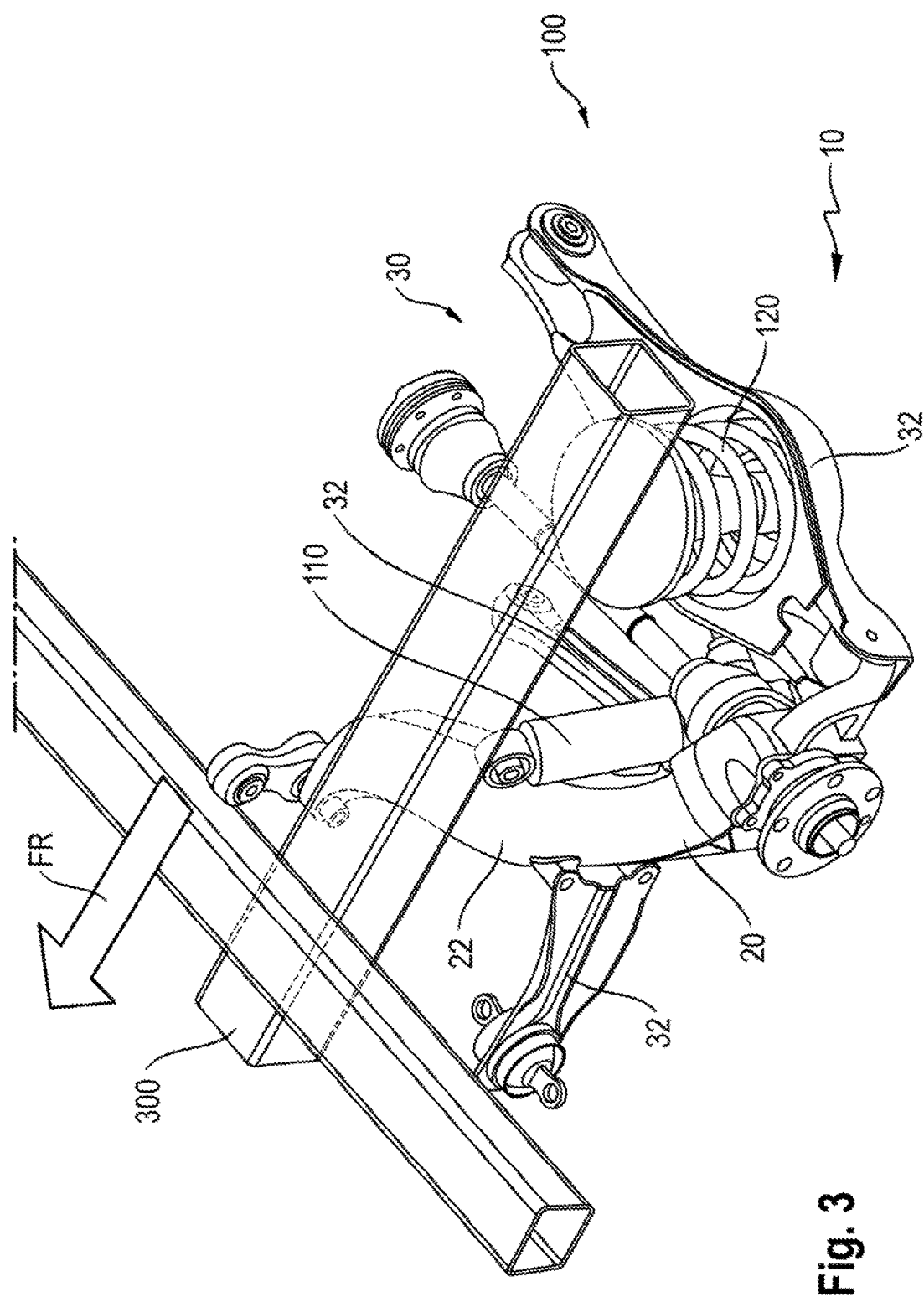
FIG. 3 shows the embodiment of FIGS. 1 and 2 in the assembled state.

FIG. 2 shows, with reference to the direction of travel, how a spring device 120 and a damping device 110 can then be provided for a rear axle of this kind in the case of the embodiment of the wheel suspension 10 according to FIG. 1. The spring device 120 is fitted in the corresponding spring receptacle of the spring link 32. A damping device 110 is fitted separately therefrom at an associated damping interface 24. As can be seen from FIG. 2 and also from the other figures, the link portion 22 forms the termination of the link system 30. The individual links 32, i.e. the spring link 32a, the track rod 32b and the control blade 32c are preferably below the wheel center plane in relation to the direction of travel and to the associated Z axis aligned centrally upward. Likewise clearly visible is the widened configuration of the wheel suspension 10. Thus, here, the link 32 which is designed as a control blade 32c is arranged ahead of the link portion 22 in relation to the direction of travel, while the two other links 32, i.e. the track rod 32b and the spring link 32a, are arranged behind the link portion in relation to the direction of travel. As can furthermore be seen from FIG. 2, the spring link 32a, the track rod 32b and the control blade 32c are arranged in such a way that a drive shaft 50 positioned perpendicularly to the direction of travel FR can be connected to a vehicle wheel. A drive shaft 50 thus has sufficient space, thus enabling the wheel suspension under consideration to be used on vehicles with rear-wheel or all-wheel steering.

An alternative embodiment to that in FIG. 2 is wherein the link portion 22a, the wheel carrier 20 and the control blade 32c are embodied as a one-piece component, preferably as a welded sheet metal component. This eliminates the screw fastening points 33 illustrated in FIG. 2. The ability to twist of the control blade 32c must, of course, be maintained in this alternative embodiment.

Figure 4:
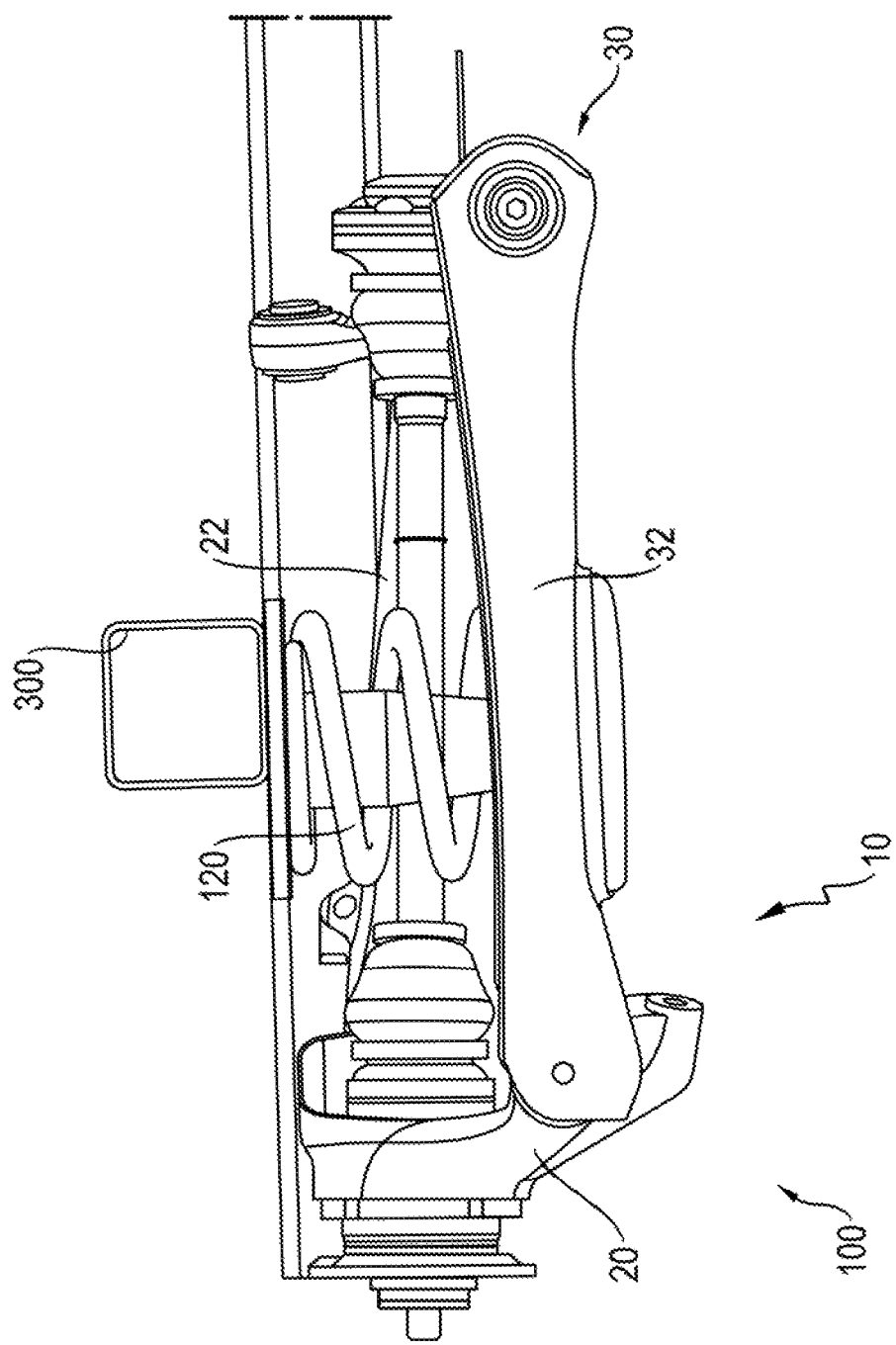
FIG. 4 shows the embodiment of FIGS. 1 to 3 in another view.

The side view shown in FIG. 4, in particular, shows the extremely shallow design of the wheel suspension 10 made possible in this way for the rear axle 100. In correlation with the vehicle body 300 illustrated in FIGS. 3 and 4, this has the effect that there now remains a large free space above the wheel suspension 10 at the rear axle 100, and this can be used as a useful space for making available a luggage space volume or, alternatively, as a volume for accommodating a rear wheel drive engine.

Figure 5:
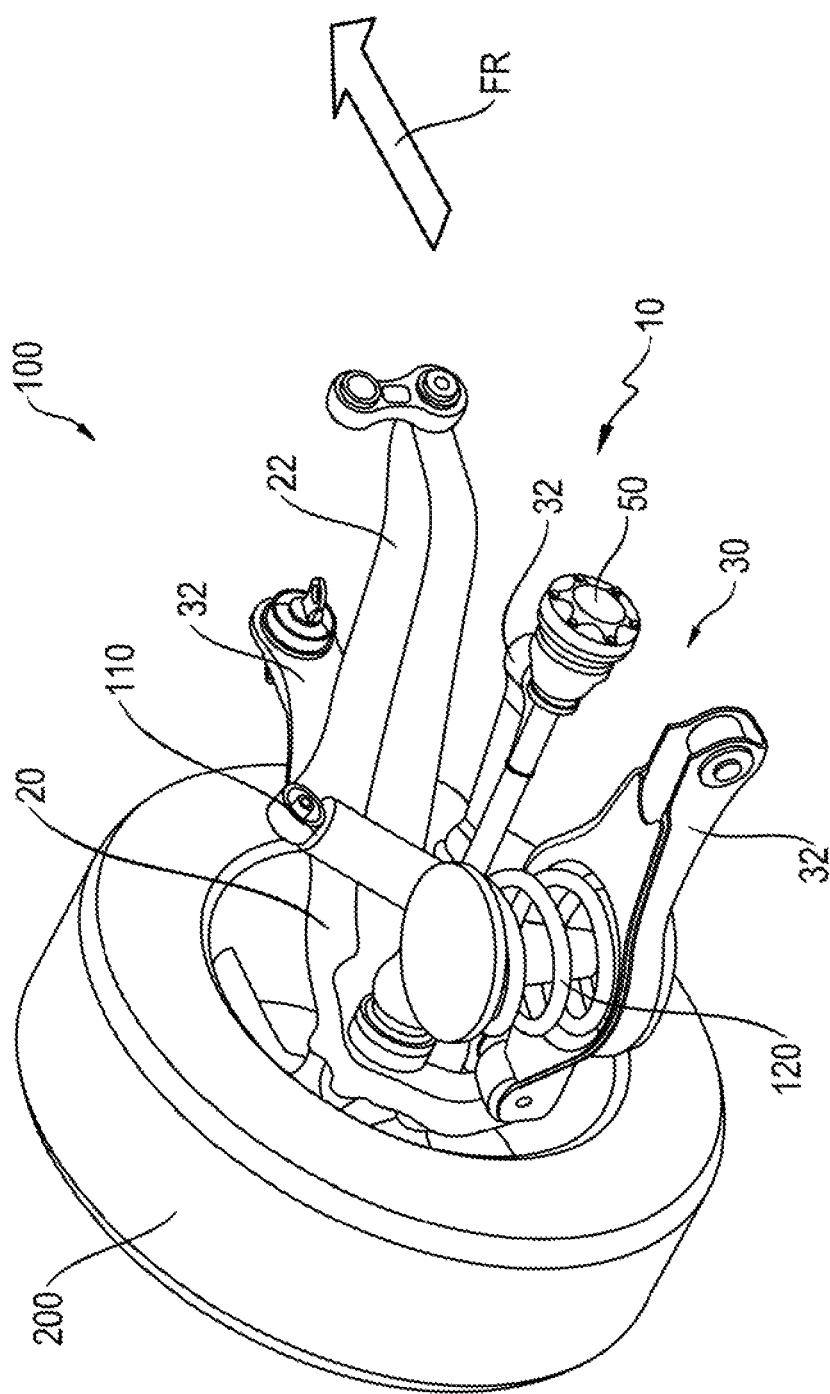
FIG. 5 shows the embodiment of FIGS. 1 to 4 with the rear wheel fitted.

FIG. 5 shows how a rear wheel 200 is then arranged on the wheel carrier 20. In order to minimize the vibration load on the vehicle and/or on the wheel suspension 10 during the operation of the vehicle and with the rear wheel 200 rotating, the individual links 32 of the link system 30, on the one hand, and, in this case, also the link portion 22 of the wheel carrier 20 are provided with appropriate rubber mounts 40 for fastening on the vehicle body 300. These rubber mounts 40 serve to reduce vibrations which arise and, in particular, to minimize the wear on the wheel suspension and the individual mounting points. In order to be able to provide the desired movement functionalities of the wheel carrier 20 and hence also of the rear wheel 200, the individual links 32 of the link system 30, in particular, are here mounted in a rotatable manner on the wheel carrier 20 or on the main body 26 thereof.

The above explanation of the embodiments describes the present invention exclusively in the context of examples. Of course, individual features of the embodiments can be freely combined with one another, insofar as this is technically feasible, without exceeding the scope of the present invention.

What is claimed is:

1. A wheel suspension for a rear axle of a vehicle, the wheel suspension comprising:
    a wheel carrier for fastening a rear wheel of the vehicle,
    a link system comprising at least two links is fastened on the wheel carrier,
    wherein the wheel carrier has a link portion for fastening on the vehicle body of the vehicle via a coupling link,
    wherein the links of the link system comprises a spring link, a track rod, a control blade, and the coupling link, and
    wherein the spring link, the track rod and the control blade are arranged in one plane, which is below a plane which passes through a wheel center.

2. The wheel suspension as claimed in claim 1, wherein the wheel carrier has a damping interface for fastening a damping device.

3. The wheel suspension as claimed in claim 1, wherein the spring link, the track rod and the control blade are arranged in such that a drive shaft positioned perpendicularly to a direction of travel can be connected to a vehicle wheel.

4. The wheel suspension as claimed in claim 1, wherein the links of the link system or the link portion of the wheel carrier has rubber mounts for fastening on the vehicle body.

5. The wheel suspension as claimed in claim 1, wherein the links of the link system are rotatably mounted on the wheel carrier.

6. The wheel suspension as claimed in claim 1, wherein the link portion, the wheel carrier and the control blade are embodied as a one-piece welded sheet metal component.

7. The wheel suspension as claimed in claim 1, wherein the link portion of the wheel carrier is formed in one piece with a main body of the wheel carrier.

8. A rear axle of a vehicle, having two wheel suspensions having the features of claim 1.

9. A wheel suspension for a rear axle of a vehicle, the wheel suspension comprising:
    a wheel carrier for fastening a rear wheel of the vehicle,
    a link system comprising at least two links is fastened on the wheel carrier,
    wherein the wheel carrier has a link portion for fastening on the vehicle body of the vehicle via a coupling link, and
    wherein the links of the link system comprises a spring link, a track rod, a control blade, and the coupling link, and
    wherein the coupling link has a lower attachment point and an upper attachment point.

10. A wheel suspension for a rear axle of a vehicle, the wheel suspension comprising:
    a wheel carrier for fastening a rear wheel of the vehicle,
    a link system comprising at least two links is fastened on the wheel carrier,
    wherein the wheel carrier has a link portion for fastening on the vehicle body of the vehicle via a coupling link, and
    wherein the links of the link system comprises a spring link, a track rod, a control blade, and the coupling link, and
    wherein the links of the link system are arranged on two different sides of the link portion of the wheel carrier, in relation to a direction of travel of the vehicle.

* * * * *